United States Patent Office 3,499,902
Patented Mar. 10, 1970

3,499,902
ORGANIC HYDRAZONE COMPOUND
CONTAINING AZO COUPLER MOIETY
Robert F. Coles, East Oakdale Township, Washington County, and Richard A. Miller, White Bear Lake, Minn., and Vsevolod Tulagin, Rochester, N.Y., assignors to Minnesota Mining and Manufacturing Company, St. Paul, Minn., a corporation of Delaware
No Drawing. Continuation-in-part of application Ser. No. 181,809, Mar. 22, 1962. This application Aug. 9, 1967, Ser. No. 659,322
Int. Cl. C07d 91/46, 49/38
U.S. Cl. 260—287    6 Claims

ABSTRACT OF THE DISCLOSURE

Normally stable organic hydrazones are provided which contain azo coupler moieties and undergo spontaneous coupling under oxidative conditions to produce azo dye color-bodies of unexpectedly dark shades.

DESCRIPTION

This is a continuation-in-part of copending application Ser. No. 181,809, filed on Mar. 22, 1962, now abandoned and based on application Ser. No. 847,101, filed Oct. 19, 1959, now Patent No. 3,076,721.

The present invention relates to novel chemical compounds and in particular to essentially colorless stable compounds containing both an azo coupler moiety and a hydrazone linkage and which under oxidizing conditions are converted to azo dye color-bodies of unexpectedly dark shades.

The novel compounds of the invention have general utility in the preparation of colored products and are particularly useful as components of heat-sensitive thermographic copy-sheets as indicated in said Patent No. 3,076,-721.

The compounds of this invention may be identified as having the structural formula

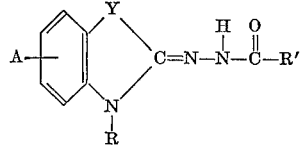

wherein A is —H, —SO$_3$H, —OCH$_3$, —CH$_3$ or —Cl; R is alkyl; R' is an aromatic azo coupler moiety having a hydroxyl radical attached directly to a ring carbon atom and having a hydrogen atom in the two or four position with respect to said hydroxyl radical and wherein said coupler moiety is bonded through a ring carbon to the carbonyl group; and Y is a divalent radical which may be —S—, —O—, —CH=CH, or

The following specific examples will further illustrate but not limit the practice of this invention.

EXAMPLE 1

3-methyl-2-benzothiazolinone 1'-hydroxy-2'-naphthoylhydrazone

A mixture of 94.5 grams of 3-methyl-2-benzothiazolinone hydrazone and 135 g. of phenyl 1-hydroxy-2-naphthoate is heated in a suitable flask under vacuum on a bath of molten metal at 160–170° C. for about one hour, until distillation of phenyl ceases. The hot solidified product is treated with 300 ml. of chlorobenzene, filtered, washed with benzene and petroleum ether, and dried. It melts at 194° C. and is identified as having the formula

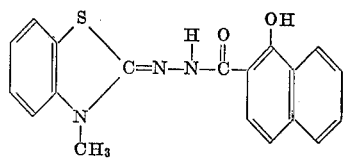

When heated to about 120° C. with an equal weight of N,N'-dichloro-N,N'-bis(m-nitrobenzenesulfonyl) ethylenediamine as an oxidizing agent, a dense purple-black color is obtained.

The corresponding 2'-hydroxy-3'-naphthoylhydrazone is prepared in similar manner using phenyl 2-hydroxy-3-naphthoate or the corresponding acid chloride.

EXAMPLE 2

1-ethyl-2-quinolinone 2'-hydroxybenzoylhydrazone

A solution of 2-ethylmercaptoquinolinium ethiodide (3.5 g., 0.01 mole) and salicylhydrazide (1.6 g., 0.01+ mole) in 10 ml. of ethanol is heated at reflux for 12 hours. The solution is cooled in ice, the solid which crystallizes is collected and washed with cold ethanol. The crude product is dissolved in 75 ml. of hot water with the aid of sufficient 10% sodium hydroxide solution to form the phenol salt. The solution is poured into 50 ml. of water containing 10 ml. of concentrated hydrochloric acid and 20 ml. of saturated sodium chloride solution. The solution is cooled and the crystalline hydrochloride salt is collected, washed with a little cold water and with acetone, and dried.

A portion of the stable colorless product is dissolved in water and treated with an oxidizing agent, e.g. a soluble persulfate, resulting in the formation of a deep magneta color.

The reaction may be represented as follows:

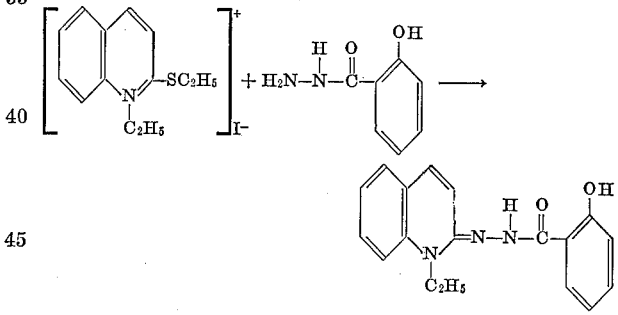

EXAMPLE 3

1,3-dimethyl-2-benzimidazolone 1'-hydroxy-2'-naphthoylhydrazone

Equimolecular amounts of 2-methylmercapto-1,3-dimethylbenzimidazolium methosulfate and of 1-hydroxy-2-naphthoylhydrazide are reacted in the same manner as in Example 2. The product is isolated from basic solution by the addition of acetic acid. Oxidation of the compound generates a magneta dye.

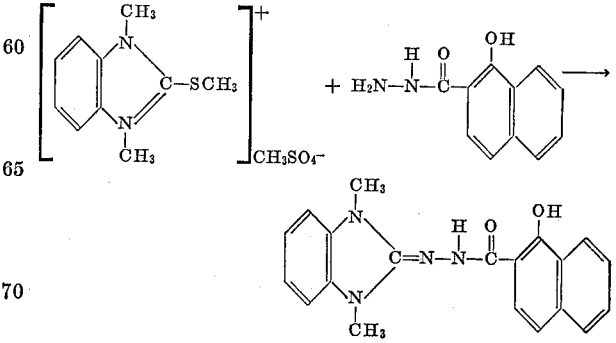

EXAMPLE 4

3-methyl-2-benzoxazolone 2'-hydroxybenzoylhydrazone

A solution of equal amounts (0.01 mole) of 2-methyl-mercapto-3-methylbenzoxazolium methosulfate and of salicylhydrazide in 10 ml. of pyridine is heated on a steam bath for one hour. The mixture is cooled and the solid reaction product is collected by filtration, washed with water, ethanol, and petroleum ether in order, and dried. The white powder melts at 252–254° C. and readily undergoes oxidative coupling with formation of a magenta dye. When developed on cotton or on acetate rayon the dye is a bluish pink and is quite substantive to the fibers.

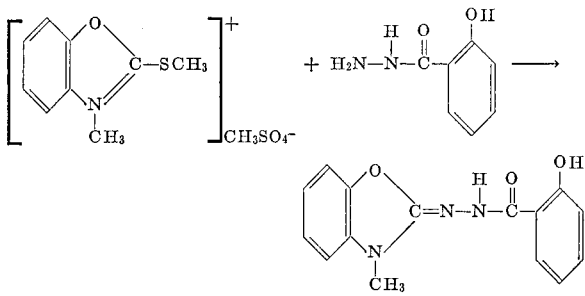

EXAMPLE 5

3-methyl-2-benzothiazolone 2'-hydroxybenzoylhydrazone 3-methyl-2-benzothiazolone hydrazone and phenyl salicylate in equal molar proportions are mixed together and heated at 140° C. in vacuo until evolution of phenol ceases, followed by purification of the product, by methods as described under Example 1.

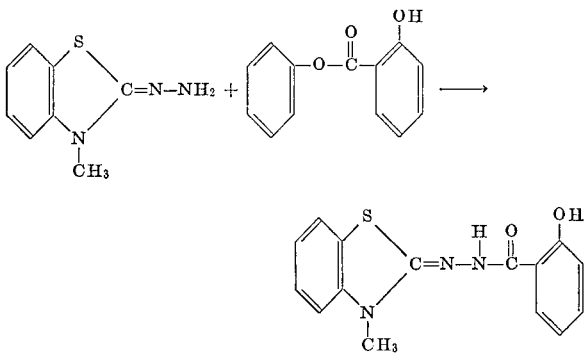

The product forms a magenta color on heating with an oxidizing agent, as for example in pyridine or dimethylformamide solution in the presence of N-chlorosulfonamide or carboxamide oxidizing agents.

EXAMPLE 6 x-Sulfo-3-methyl-2-benzothiazolone 1'-hydroxy-2'-naphthoylhydrazone

To a mixture of 10 ml. of pyridine and 10 ml. of dimethylformamide is added 5.2 g. (0.02 mole) of x-sulfo-3-methyl-2-benzothiazolonehydrazone and 9 g. (0.034 mole) of phenyl 1-hydroxy-2-naphthoate. The mixture is heated at reflux for 3 hours and is then poured into 150 ml. of water and acidified with excess hydrochloric acid. A gummy residue is first obtained, which solidifies on trituration. It is collected, extracted with methanol to remove excess phenyl ester, and dissolved in 150 ml. of hot water containing 3 ml. of pyridine. Acidification with hydrochloric acid of the filtered solution isolates the semi-purified product. It may be further purified by crystallization as the sodium or potassium salt. A small amount of the product dissolved in hot water and pyridine is applied to cotton which is then rinsed and further treated with hot dilute aqueous ammonium persulfate. The cotton is substantively dyed to a purple color.

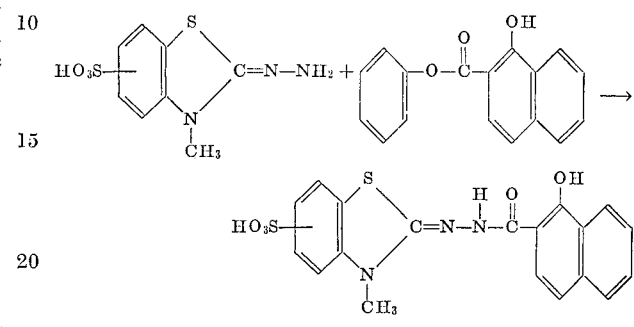

The x-sulfo-3-methyl-2-benzothiazolonehydrazone is prepared by subjecting 3-methyl-2-benzothiazolonehydrazone to the action of 20% oleum at room temperature for four hours.

Substituent radicals other than the sulfonic radical may be employed in these compounds where desired, typical examples being methoxy, methyl and chloro.

Other analogous chemical compounds containing both an aromatic hydrazone moiety and an active azo coupler moiety, which may be prepared by similar techniques and which are similarly effective as sources of color-bodies through oxidative coupling reactions as hereinbefore described, include the following; the above examples being included for convenience:

3-methyl-2-benzothiazolon 1'-hydroxy-2-'-napthoylhydrazone;
1-ethyl-2-quinolinone 2'-hydroxybenzoylhydrazone;
1,3-dimethyl-2-benzimidazolone 1'-hydroxy-2'-napthoylhydrazone;
3-methyl-2-benzoxazolone 2'-hydroxybenzoylhydrazone;
3-methyl-2-benzothiazolone 2'-hydroxybenzoylhydrazone;
x-sulfo-3-methyl-2-benzothiazolone 1'-hydroxy-2'-naphthoylhydrazone;
3-methyl-2-benzothiazolon 2'-hydroxy-3'-napththoylhydrazone;
5-chloro-3-methyl-2-benzothiazolone 1'-hydroxy-2'-naphthoylhydrazone;
1,3,5-trimethyl-2-benzimidazolone 1'-hydroxy-2'-naphthoylhydrazone;
1-ethyl-6-methoxy-2-quinolinone 2'-hydroxybenzoylhydrazone;
3-methyl-2-benzothiazolone 4'-(1-hydroxy-3-sulfo-6-napthylamino)-benzoylhydrazone;
3-methyl-2-benzothiazolone 4'-(1-hydroxy-2-napthoylamino)-phenoxyacetylhydrazone;
3-methyl-2-benzothiazolone 3'-(3-hydroxyphenylcarbamyl)-propionylhydrazone;
3-methyl-2-benzothiazolone 3'-(1-hydroxy-3,6-disulfo-8-napthylcarbamyl)propionylhydrazone.

What is claimed is as follows:

1. The compound 3-methyl-2-benzothiazolinone-1'-hydroxy-2'-napthoylhydrazone.
2. The compound 1-ethyl-2-quinolinone-2'-hydroxybenzoylhydrazone.
3. The compound 1,3-dimethyl-2-benzimidazolone-1'-hydroxy-2'-napththoylhydrazone.
4. The compound 3-methyl-2-benzoxazolone-2'-hydroxybenzoylhydrazone.

5. The compound 3-methyl-2-benzothiazolone-2'-hydroxybenzoylhydrazone.

6. The compound x-sulfo-3-methyl-2-benzothiazolone-1'-hydroxy-2'-naphthoylhydrazone.

References Cited

UNITED STATES PATENTS

| | | | |
|---|---|---|---|
| 3,076,721 | 2/1963 | Coles et al. | 260—240 XR |
| 3,099,559 | 7/1963 | Coles | 260—287 XR |
| 3,149,990 | 9/1964 | Coles | 260—240 XR |
| 3,346,585 | 10/1967 | Dehnert | 260—288 X |

DONALD G. DAUS, Primary Examiner

U.S. Cl. X.R.

117—36.8; 260—240, 286, 305, 307, 309.2, 473, 474, 544, 559. 687